(12) United States Patent
Gentner et al.

(10) Patent No.: US 9,908,503 B2
(45) Date of Patent: Mar. 6, 2018

(54) SEATBELT RETRACTOR

(75) Inventors: Brend Gentner, Ellwangen/Pfahlheim (DE); Thomas Moedinger, Alfdorf (DE); Andreas Pregitzer, Ellenberg/Krassbronn (DE); Scott M. Franz, Clinton Township, MI (US)

(73) Assignee: TRW Automotive GmbH (DE)

( * ) Notice: Subject to any disclaimer, the term of this patent is extended or adjusted under 35 U.S.C. 154(b) by 692 days.

(21) Appl. No.: 14/008,101

(22) PCT Filed: Apr. 3, 2012

(86) PCT No.: PCT/EP2012/001473
§ 371 (c)(1),
(2), (4) Date: Sep. 27, 2013

(87) PCT Pub. No.: WO2012/143090
PCT Pub. Date: Oct. 26, 2012

(65) Prior Publication Data
US 2014/0014758 A1    Jan. 16, 2014

(30) Foreign Application Priority Data

Apr. 5, 2011 (DE) .................. 10 2011 016 153

(51) Int. Cl.
*B60R 22/34* (2006.01)
*B60R 22/46* (2006.01)

(52) U.S. Cl.
CPC .......... *B60R 22/34* (2013.01); *B60R 22/4628* (2013.01); *B60R 2022/4647* (2013.01)

(58) Field of Classification Search
CPC . B60R 22/4633; B60R 22/4628; B60R 22/46; B60R 22/341; B60R 2022/468
USPC .......................................... 242/374
See application file for complete search history.

(56) References Cited

U.S. PATENT DOCUMENTS

| | | | | |
|---|---|---|---|---|
| 4,006,644 A | * | 2/1977 | Beier | 297/478 |
| 4,444,010 A | * | 4/1984 | Bendler | 60/407 |
| 6,299,090 B1 | * | 10/2001 | Specht et al. | 242/374 |
| 6,454,199 B1 | * | 9/2002 | Hori et al. | 242/374 |

(Continued)

FOREIGN PATENT DOCUMENTS

| | | |
|---|---|---|
| DE | 10343195 | 10/2004 |
| DE | 202006014487 | 2/2007 |

(Continued)

*Primary Examiner* — Michael R Mansen
(74) *Attorney, Agent, or Firm* — Tarolli, Sundheim, Covell & Tummino LLP

(57) ABSTRACT

In a belt retractor (10) having a belt tensioner (16) and a force-limiting device, the belt tensioner (16) includes a pivoted pinion gear (24) associated with a belt reel (14), a drive unit (18) and an oblong force-transmitting element (22) movable by the drive unit (18) supported at least partly in a tubular portion (21) and adapted to be engaged in the pinion gear (24) so as to rotate the pinion gear (24) in a tensioning direction (A). The force-transmitting element (22) includes a bending portion (30) which is provided at the rear end of the force-transmitting element (22) viewed in the tensioning direction and which is designed to be pressure-resistant in the longitudinal direction (L) of the force-transmitting element (22) but to be flexible in a direction perpendicular to the longitudinal direction (L).

22 Claims, 8 Drawing Sheets

(56) References Cited

U.S. PATENT DOCUMENTS

| | | | |
|---|---|---|---|
| 6,994,288 B2* | 2/2006 | Wier | 242/374 |
| 7,080,799 B2* | 7/2006 | Singer et al. | 242/374 |
| 7,237,741 B2* | 7/2007 | Specht | 242/374 |
| 7,422,173 B2* | 9/2008 | Wier | 242/374 |
| 7,793,982 B2* | 9/2010 | Krauss | 280/806 |
| 2006/0266866 A1* | 11/2006 | Schmidt et al. | 242/374 |
| 2007/0241550 A1 | 10/2007 | Bieg et al. | |

FOREIGN PATENT DOCUMENTS

| | | |
|---|---|---|
| DE | 102006031369 | 10/2007 |
| DE | 102006043022 | 3/2008 |
| DE | 102007040254 | 2/2009 |
| DE | 10 2007 044 843 | 3/2009 |
| WO | 2005/066001 | 7/2005 |
| WO | 2009/024616 | 2/2009 |

\* cited by examiner

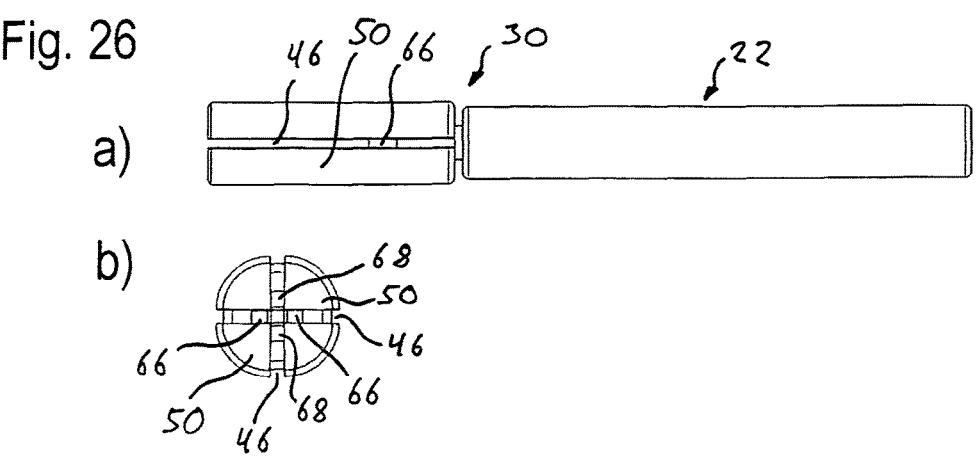

SEATBELT RETRACTOR

RELATED APPLICATIONS

This application corresponds to PCT/EP2012/001473, filed Apr. 3, 2012, which claims the benefit of German Application No. 10 2011 016 153.8, filed Apr. 5, 2011, the subject matter of which are incorporated herein by reference in their entirety.

BACKGROUND OF THE INVENTION

The invention relates to a belt retractor comprising a belt tensioner and a force-limiting device, wherein the belt tensioner includes a pivoted pinion gear associated with a belt reel, a drive unit and an oblong force-transmitting element movable by the drive unit which is at least partly supported in a tubular portion and can be engaged in the pinion gear so as to rotate the pinion gear in a tensioning direction.

Belt retractors usually include a belt tensioner adapted to counteract a belt slack of the seat belt and a film-spool effect of the seat belt wound on the belt reel. Such belt tensioner comprises, e.g., a pivoted pinion gear coupled to the belt reel, a drive unit and a force-transmitting element moved by the drive unit which is at least partly supported in a tubular portion, the tubular portion usually being curved for lack of space. Upon activation of the belt tensioner the force-transmitting element is displaced in the tubular portion and partly driven out of the same by the, for example, pyrotechnic drive unit. The force-transmitting element then engages in the pinion gear and with a further movement causes a rotation of the pinion gear and thus of the belt reel coupled to the pinion gear in a tensioning direction. The force-transmitting element is designed so that the force-transmitting element is in mesh with the pinion gear in the position taken by the pinion gear after rotation by the force-transmitting element.

Upon completion of the tensioning operation a force-limiting device ensures that the restraining force of the seat belt acting on the vehicle occupant after tensioning does not excessively increase during the vehicle deceleration. For this purpose, upon completion of the tensioning operation a defined webbing extension is allowed by the force limiter permitting a limited rotation of the belt reel in the direction of webbing extension, i.e. against the tensioning direction. By rotation of the belt reel also the pinion gear coupled to the belt reel is rotated against the tensioning direction, however, whereby the force-transmitting element which continues engaging in the pinion gear is pushed back into the tubular portion. Since said tubular portion is curved, however, the force-transmitting element has to be additionally bent during insertion so as to adapt the force-transmitting element to the course of the tubular portion again. To this end, an additional deformation has to take place which results in an increase in the compressive force required for inserting the force-transmitting element. However, this affects the responsive behavior of the force-limiting device, as in the case of force limitation this compressive force has to be overcome in addition to the resistance of the force limiter.

SUMMARY OF THE INVENTION

It is the object of the invention to provide a belt retractor comprising a belt tensioner and a force-limiting device in which the force-limiting device is not influenced by the belt tensioner.

For achieving the object a belt retractor comprising a belt tensioner and a force-limiting device is provided, the belt tensioner including a pivoted pinion gear associated with a belt reel, a drive unit and an oblong force-transmitting element movable by the drive unit which is at least partly supported in a tubular portion and is adapted to be engaged in the pinion gear so as to rotate the pinion gear in a tensioning direction, wherein the force-transmitting element has a bending portion provided at the rear end of the force-transmitting element viewed in the tensioning direction and being formed to be pressure-resistant in the longitudinal direction of the force-transmitting element but flexible in a direction perpendicular to the longitudinal direction. The invention is based on the consideration to design the portion of the force-transmitting element which during force limitation is pushed back into the tubular portion or into the curved tubular portion in such way that it is capable of transmitting the compressive force acting on the force-transmitting element by the drive unit during the tensioning operation to the pinion gear as loss-free as possible, i.e. it is very pressure-resistant but can be bent by a low force so that the force-transmitting element can be pushed back into the tubular portion at low resistance or can be deformed upon insertion and can be adapted to the course of the tubular portion. Thus the bending portion is formed to be so soft that it puts merely a low resistance against a bending deformation when the force-transmitting element is being pushed back into the tubular portion. In this way, the force-limiting operation is not or merely slightly influenced by the belt tensioner.

In order to design the bending portion as flexible as possible it is imaginable, for example, that the bending portion includes at least one constriction peripheral in the circumferential direction. Due to the smaller diameter the flexural stiffness is definitely reduced at the constriction so that the latter acts so-to-speak as a joint subdividing the bending portion into plural portions movable relative to each other. The diameter of the constrictions is selected so that a sufficient transmission of the compressive force is possible.

The radial depth as well as the number and position of constrictions can be adapted in any way dependent on the desired flexural stiffness. The constrictions are arranged, for example, at regular intervals and/or have the same radial depth each, thereby the bending portion having a constant flexibility over the entire length.

The constrictions can form an oblong area having a smaller diameter also viewed in the longitudinal direction. This area has a low flexural stiffness due to the smaller diameter. Moreover, because of the smaller diameter this area has larger play in the tubular portion so that the force-transmitting element can be displaced more easily in the tubular portion. Furthermore, this area can provide a damping function for the belt tensioner so as to prevent the tensioning force from increasing too rapidly. When activating the belt tensioner and the compressive force resulting therefrom on the force-transmitting element this area can be upset, wherein the same is slightly reduced. By this reduction the diameter of this area widens maximally to the diameter of the residual force-transmitting element or to the diameter of the tubular portion. By the reduction of this portion at the beginning of the tensioning operation a damping occurs, thereby the tensioning force increasing more slowly. This area preferably is dimensioned so that the area can be upset by the compressive force occurring during the tensioning operation. The compressive force transmitted by the pinion gear during the subsequent force limitation is by far lower, however, so that the area is not upset when the force-transmitting element is pushed back.

In order to increase the flexibility of the force-transmitting element also other forms of the force-transmitting element are possible in which the cross-section is reduced in portions so as to increase the flexibility and thus to reduce the flexural stiffness while at the same time ensuring sufficient compressive stiffness. It is also imaginable, for instance, that the force-transmitting element includes grooves extending in the longitudinal direction.

The grooves can extend over the entire length of the force-transmitting element, thereby substantially facilitating manufacture of the force-transmitting element. The force-transmitting element thus can be manufactured by extrusion-molding.

For example, it is also imaginable, however, that the grooves are provided only in the bending portion so as not to influence the stiffness in the residual force-transmitting element.

Independently of the length of the grooves, they can extend through the force-transmitting element in the radial direction. In this way the force-transmitting element can be compressed perpendicularly to the longitudinal direction. On the one hand, this allows a reduction of cross-section by which the force-transmitting element can be pushed back more easily into the tubular portion as already explained.

In another embodiment it is provided that the force-transmitting element includes a cavity extending in the longitudinal direction which extends at least through the entire bending portion. It is also possible, however, that this cavity extends through the entire force-limiting element.

All embodiments in which the cross-section of the force-transmitting element is reduced over a larger portion viewed in the longitudinal direction furthermore offer the advantage that they put a lower resistance against the pinion gear when rotated against the tensioning direction. The passage between the pinion gear and the tubular portion usually is selected to be smaller than the diameter of the force-transmitting element. Upon tensioning the force-transmitting element is hence clamped between the pinion gear and the tubular wall and is squeezed through this smaller cross-section, whereby a safe force transmission between the force-transmitting element and the pinion gear is ensured. Due to the smaller cross-section the force-transmitting element can be passed by the pinion gear at a lower resistance mainly during the subsequent force-limiting operation, as the smaller cross-section permits an easier deformation of the force-transmitting element.

It is also imaginable, however, that the force-transmitting element has a cavity which is filled with a preferably pressure-resistant core. In this case the force-limiting element can be made of a soft, especially a flexible material. The compressive forces are transmitted via the pressure-resistant core.

Preferably the core is made of a harder material than the force-transmitting element. Depending on the embodiment, the force-transmitting element is made of a softer material into which the pinion gear can dig itself during the tensioning operation. The core can be made of a substantially harder material, as the pinion gear does not have to dig itself into the same.

Between the bending portion and the residual force-transmitting element also at least one predetermined breaking point can be provided. The predetermined breaking point is preferably arranged so that it is passed by the pinion gear during a tensioning operation. The force-transmitting element is separated at the predetermined breaking point during the tensioning operation so that the area separated from the force-transmitting element by the predetermined breaking point remains ahead of the pinion gear during the subsequent force-limiting operation and need not be pushed back toward the tubular portion any more.

The force-transmitting element can also consist of plural partial elements, for example, which are flexibly coupled to each other. Since these elements merely have to transmit a compressive force, it is not necessary to tightly interconnect them. It is merely required that they are capable of transmitting a compressive force. Hence they can also be adjacent to each other in the tubular portion without any tight connection.

The partial elements can be partly spacer balls, for instance.

Preferably the rear end of the force-transmitting element is conically widened. In the case of a pyrotechnic drive unit a sealing of the force-transmitting element against the tubular portion or toward the drive unit is required to prevent the gas from flowing past the force-transmitting element so that sufficient pressure build-up is possible. For this purpose, usually behind the force-transmitting element a ball or any other suitable sealing member is provided. In accordance with the invention, this sealing member is replaced by a conical widening of the force-transmitting element so that no additional component part is required for sealing. The widening is formed so that the force-transmitting element peripherally contacts the inner wall of the tubular portion and thus completely seals the tubular portion. In the case of an increase in pressure in the tubular portion the seal is automatically forced against the tubular wall by the conical widening so that sufficient tightness is ensured even in the case of increasing pressure.

BRIEF DESCRIPTION OF THE DRAWINGS

Further features and advantages of the invention will result from the following description and from the enclosed drawings which are referred to. The drawings show in.

DESCRIPTION OF EXEMPLARY EMBODIMENTS

Figure 1:
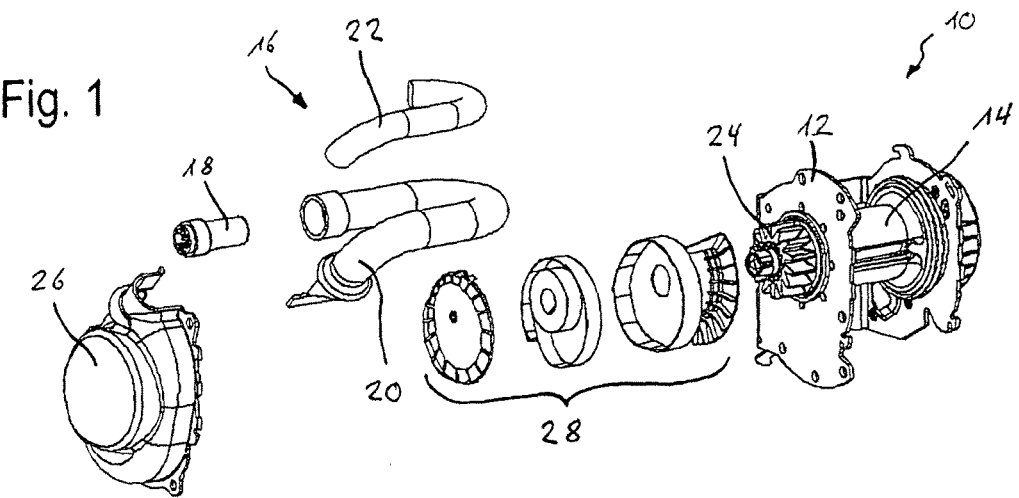
FIG. 1 an exploded view of a belt retractor according to the invention.
Figure 2:
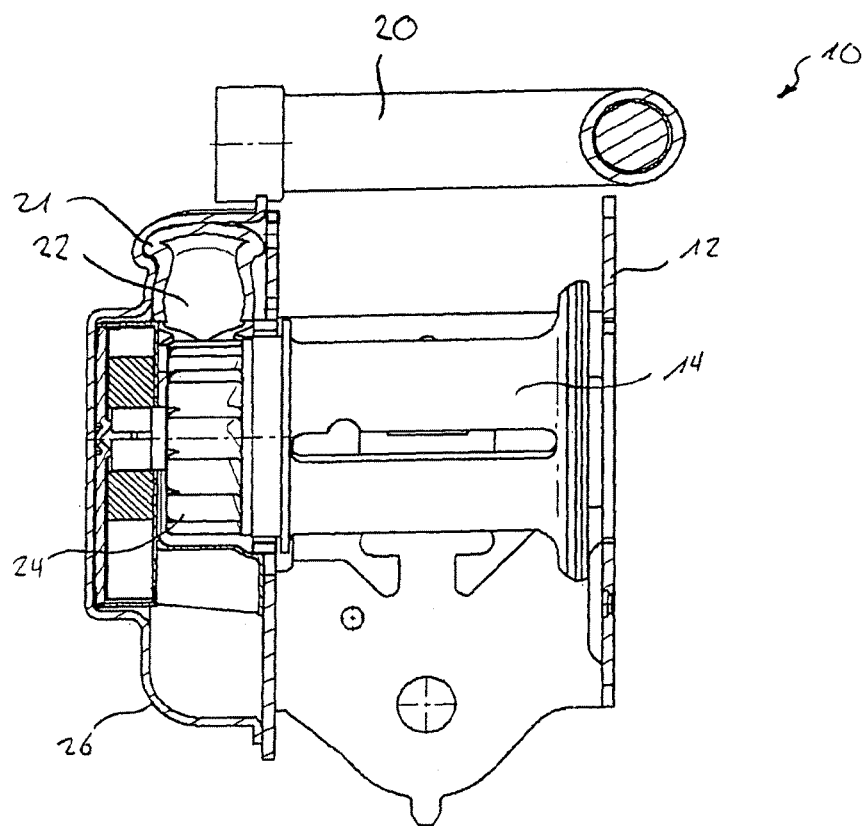
FIG. 2 a sectional view of the assembled belt retractor from FIG. 1.

In FIG. 1 the substantial component parts of a belt retractor 10 comprising a pyrotechnically driven belt tensioner 16 are shown. In FIG. 2 the belt retractor is illustrated in the assembled state. The belt retractor 10 comprises a frame 12 to which a belt reel 14 is pivoted onto which a seat belt can be wound. Furthermore the belt retractor 10 includes a force-limiting device not shown here in detail.

The belt tensioner 16 of the belt retractor 10 includes a pyrotechnic drive unit 18, a tensioner tube 20 having a bent tubular portion 21, a force-transmitting element 22 disposed in the tensioner tube 20 as well as a pinion gear 24 coupled to the belt reel 14. The component parts of the belt tensioner 16 are jointly arranged in a tensioner housing 26. In FIG. 1 furthermore the retracting mechanism 28 of the belt retractor 10 is shown. This mechanism is not important to the function of the belt tensioner 16 and the force-limiting device, respectively, so that it is not explained in detail.

Figure 3:
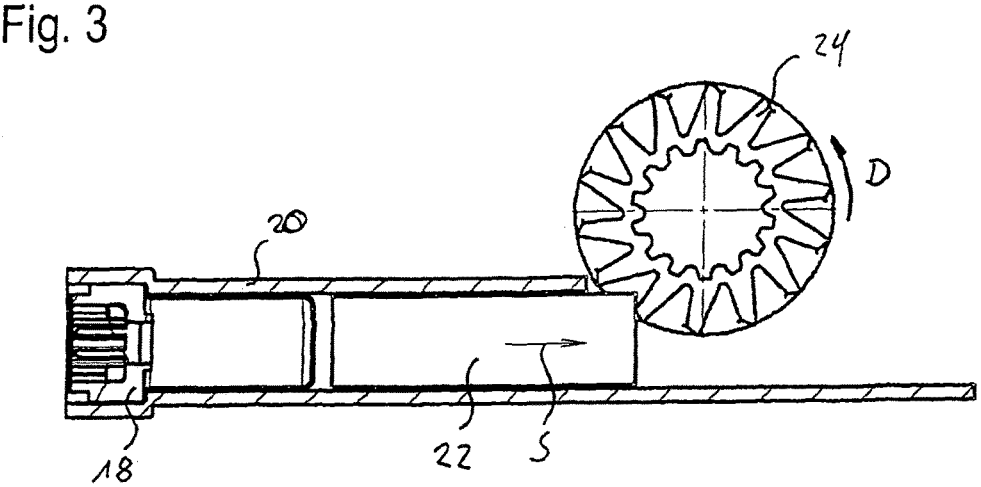
FIG. 3 a schematic partial section of the belt tensioner from the belt retractor of FIG. 1, and each of the FIGS. 4a) and b) to 26a) and b) different embodiments of a force-transmitting element according to the invention in a perspective view, in a side view or in a sectional view.

The belt tensioner 16 is shown in FIG. 3 in a simplified form before the tensioning operation so as to illustrate the general functioning of such belt tensioner 16. For belt tensioning the pyrotechnic drive unit 18 is activated, thereby generating excessive pressure in the tensioner tube 20. In this way the force-transmitting element 22 is pressurized in the tensioner tube 20 and is moved in a tensioning direction S away from the drive unit 18, wherein the force-transmitting element 22 engages in the pinion gear 24. Upon further movement of the force-transmitting element 22 in the tensioning direction S the pinion gear 24 is rotated by force by the force-transmitting element 22 in a direction of rotation D. The belt reel 14 coupled to the pinion gear 24 is rotated with the same, wherein the seat belt is wound onto the belt reel 14 and thus belt tensioning is effectuated. Such belt tensioner is known from DE 10 2006 031 369.

The force-transmitting element 22 can exhibit a suitable geometry in which the pinion gear 24 can engage, for example a gear rack geometry. It is also imaginable, however, that the force-transmitting element 22 is made of a softer material than the pinion gear 24 and the latter digs itself into the surface of the force-transmitting element 22 when the force-transmitting element 22 is displaced.

During a force-limiting operation following the belt tensioning a limited rotation of the belt reel 14 against the direction of rotation D is allowed so as to prevent the forces acting on the vehicle occupant from excessively increasing. By rotation of the belt reel 14 against the direction of rotation D also the pinion gear 24 coupled to the belt reel 14 is rotated against the direction of rotation D. However, the force-transmitting element 22 is configured so that it is still in mesh with the pinion gear 24 after completion of the tensioning operation, i.e. it has not been completely passed by the same. Upon rotation of the belt reel 14 against the direction of rotation D, the force-transmitting element 22 therefore is moved by the pinion gear 24 in mesh with the force-transmitting element 22 against the tensioning direction S and is pushed back into the tensioner tube 20 and the tubular portion 21, respectively.

Since the tubular portion 21 has a bent or curved shape for lack of space, however, it is not only necessary to overcome the friction forces of the force-transmitting element 22 in the tensioner tube 20. In addition, the force-transmitting element 22 has to be bent so as to adapt it to the shape of the tubular portion 21. The work required for this acts as additional resistance, however, which acts on the belt reel 14 via the pinion gear 24 and influences the functioning of the force-limiting device and thus the belt webbing extension. In other words, for force limitation, i.e. a limited webbing extension, not only the resistance of the force-limiting device but also the resistance of the belt tensioner, i.e. the force-transmitting element 22 in the tensioner tube 20 has to be overcome.

In order to keep such influence of the force-limiting device as small as possible it is provided that the force-transmitting element 22 is designed to be flexible in a bending portion 30 substantially corresponding to the area of the force-transmitting element 22 which is pushed back into the bent tubular portion 21. That is to say, the force-transmitting element is designed to be pressure-resistant in this area so that it can transmit the tensioning force produced by the drive unit 18 to the pinion gear 24. At the same time, however, the force-transmitting element 22 is designed to be flexible in this bending portion 30 so that the required bending work for adapting the bending portion 30 to the shape of the tubular portion 21 is as little as possible. The bending portion is thus formed on the side facing the pyrotechnic drive unit 18.

Figure 4:
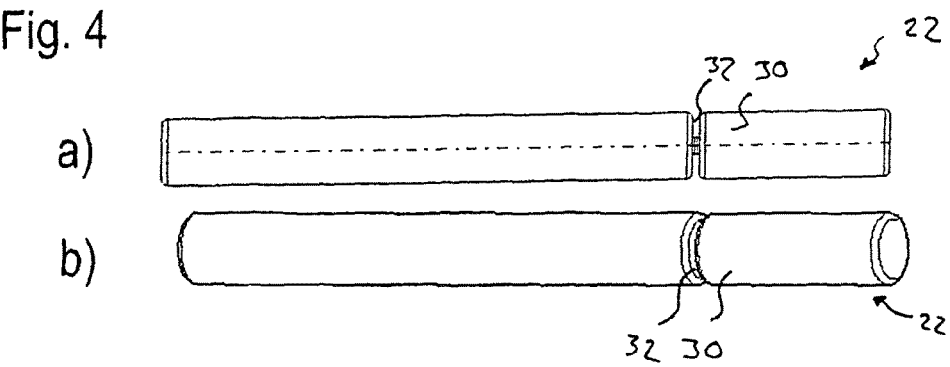
Figure 5:
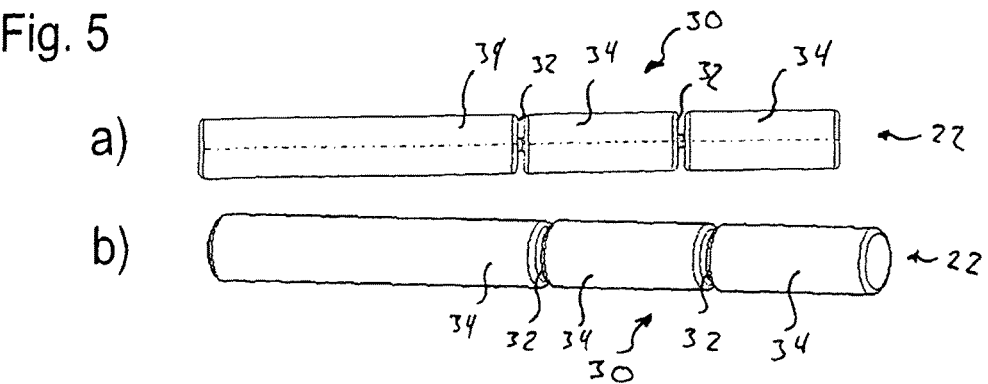
Figure 6:
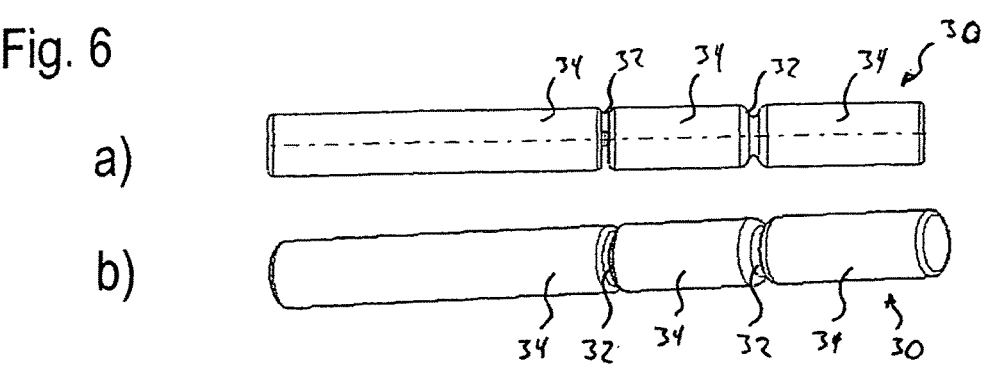
Figure 7:
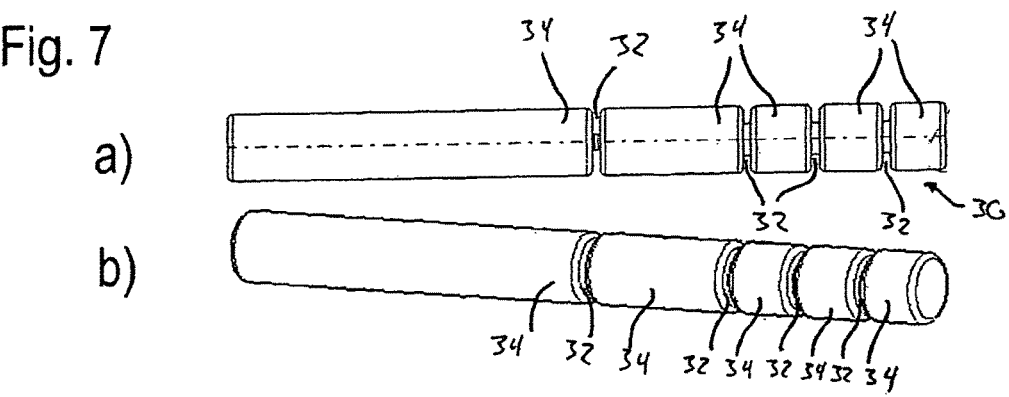
Figure 8:
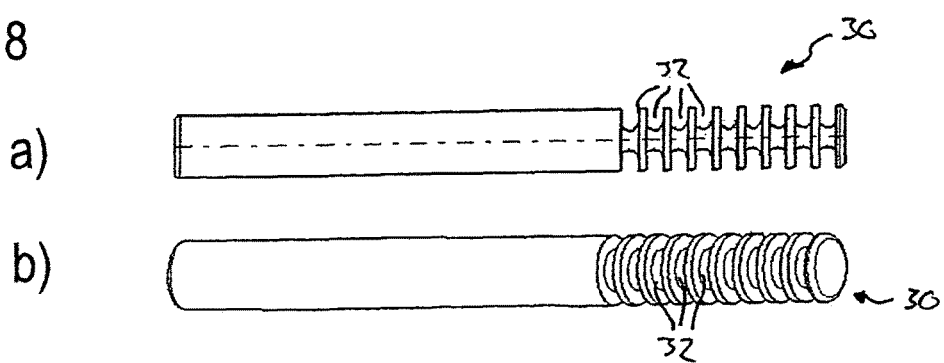
Figure 9:
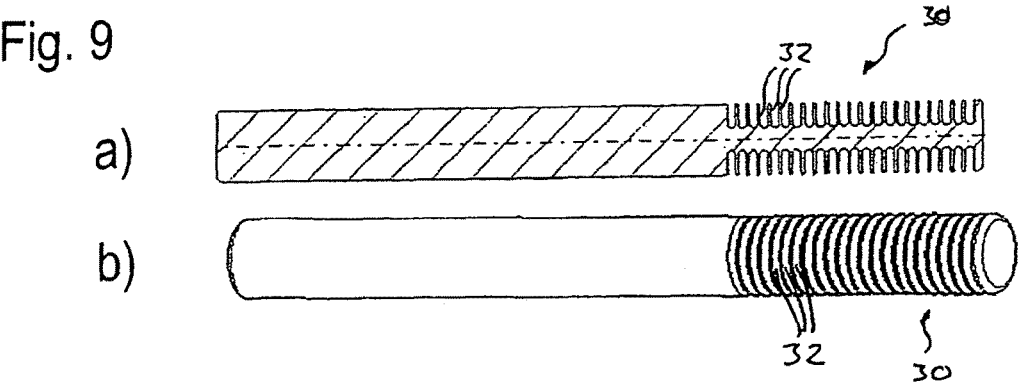
Figure 10:
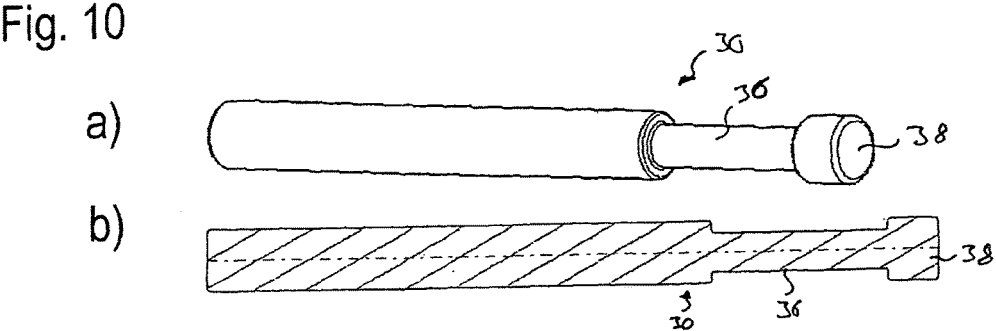

A first embodiment of such force-transmitting element 22 is shown in FIGS. 4a) and b). In this case at the bending portion 30 a constriction 32 is provided at which the diameter of the force-transmitting element 22 is clearly reduced in the circumferential direction. Due to the smaller diameter the force-transmitting element 22 has a lower flexural stiffness in this area. Thus the constriction 32 acts so-to-speak as a joint about which the bending portion 30 can be bent.

By adapting the number and distribution of the constrictions 32 as well as the radial depth the flexibility of the bending portion 30, i.e. the flexural stiffness, can be adapted in any way. In the FIGS. 5 to 12a) and b) different configurations of force-transmitting elements 22 including constrictions 32 are shown. All of these embodiments have in common a solid continuous core which provides for sufficient compressive stiffness of the force-transmitting element.

The embodiments illustrated in the FIGS. 5a) and b), 6a) and b) as well as 7a) and b) differ from the embodiment shown in the FIGS. 4a) and b) merely by the number, the distance and the depth of the constrictions 32.

In FIGS. 5a) and b) the bending portion 30 is subdivided by two constrictions 32 into plural segments 34 movable relative to each other. In FIGS. 6a) and b) equally two constrictions are provided, wherein they have a different depth. A smaller depth of the constriction increases the flexural stiffness. Thus a different depth of the constrictions 32 also enables section-wise adaptation of the flexural stiffness, for example to the course of the tubular portion 21. In FIGS. 7a) and b) the bending portion 30 is subdivided into segments 34 of different length by plural constrictions 32, thereby the flexural stiffness being equally adapted.

In the embodiments shown in FIGS. 8a) and b) and 9a) and b) the constrictions 32 are arranged so closely to each other that they form sort of a pine-tree profile allowing a particularly flexible design of the bending portion 30.

In the embodiment illustrated in FIGS. 10a) and b) the constriction 32 is an oblong area 36 in which the diameter of the force-transmitting element 22 is reduced over a quite long area. By reason of the smaller diameter the flexural stiffness of this area 36 is lower than that of the force-transmitting element 22. In addition, this area has a larger play in the tensioner tube 20 due to the smaller diameter so that an easier movement of this area 36 in the tensioner tube 20 and especially in the tubular portion 21 is possible.

At the beginning of the tensioning operation moreover a damping of the tensioning effect and thus a slower increase in the tensioning force can be caused via this area 36. In the case of suddenly increasing pressure onto the end 38 of the force-transmitting element 22 facing the drive unit 18 the oblong area 36 is first compressed in the longitudinal direction and is widened until it has adopted the diameter of the residual force-transmitting element 22 or is adjacent to the inner wall of the tensioner tube 20. This reduction of the force-transmitting element 22 prevents the tensioning force from increasing too rapidly. This oblong area 36 is preferably designed so that a reversible compression can take place due to the increase in pressure suddenly occurring during a tensioning operation. The compressive force applied to the force-transmitting element 22 in a subsequent tensioning operation for pushing the force-transmitting element 22 back into the tensioner tube 20 is not sufficient, however, to compress the oblong area 36.

Figure 11:
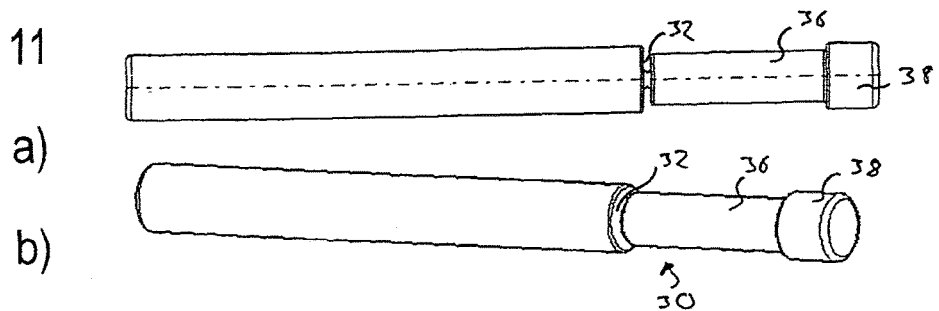

The embodiment shown in FIGS. 11 a) and b) substantially corresponds to the embodiment shown in FIGS. 10a) and b). In this case merely additionally a constriction 32 is arranged between the area 36 having a reduced diameter and the residual bending portion 30.

Figure 12:
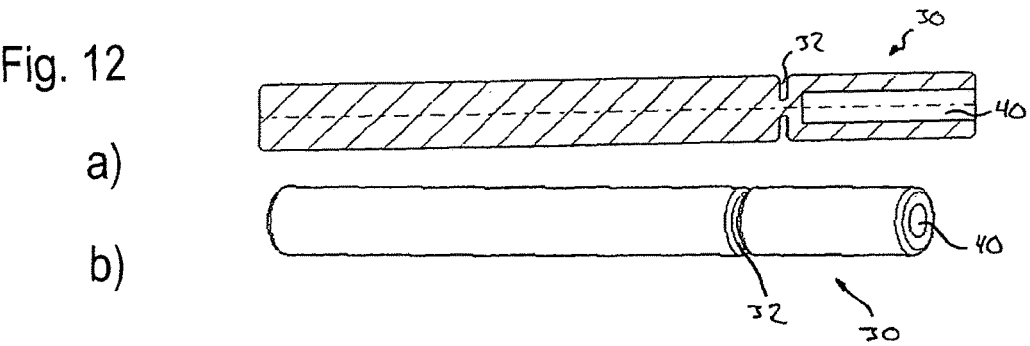

The embodiment shown in FIGS. 12 a) and b) includes, in addition to the constriction 32, a cavity 40 extending in the longitudinal direction which in this case extends substantially through the entire bending portion 30. Due to the reduced cross-section on the one hand the flexural stiffness of the bending portion 30 is reduced. In addition, the bending portion 30 can be compressed perpendicularly to the longitudinal direction so that additionally a movability or deformability of the bending portion 30 is possible.

Figure 13:
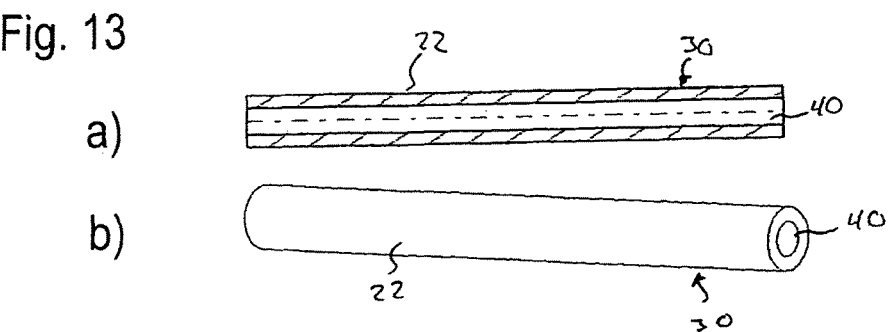
Figure 14:
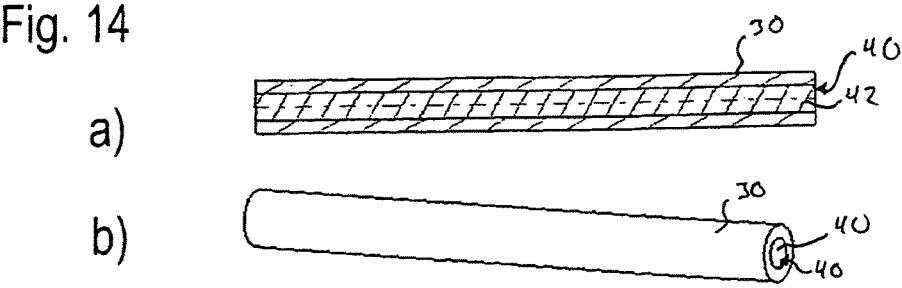

In the embodiment shown in FIGS. 13a) and b) the cavity 40 extends through the entire force-transmitting element 22. In order to increase the compressive stability of such force-transmitting element, for instance a core 42 can be inserted in said cavity 40, as it is shown, for example, in the embodiment in FIGS. 14a) and b). This core can be made of a more stable material, for example, so that it is capable of transmitting a higher compressive force. Due to the smaller diameter it is still very flexible so that the force-transmitting element 22 can be bent especially in the bending portion 30 with low resistance.

Figure 15:
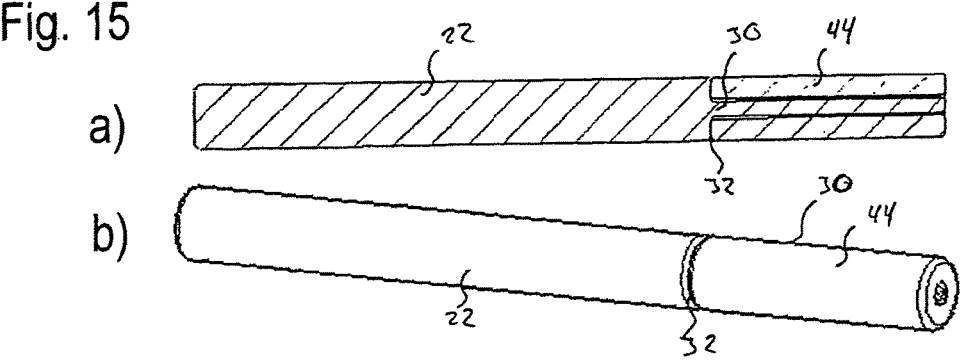

However, it is also possible that the force-transmitting element has a smaller diameter in the bending portion 30 so as to reduce the flexural stiffness, and that a shell 44 made of a softer material or a flexible material is provided, as is illustrated, for example, in FIGS. 15a) and b). The transition between the shell 44 and the force-transmitting element in this case additionally constitutes a constriction 32.

Such two-piece force-transmitting element 22, especially with an outer softer material, can be made, for instance, of plastic material by two-component injection molding.

Figure 16:
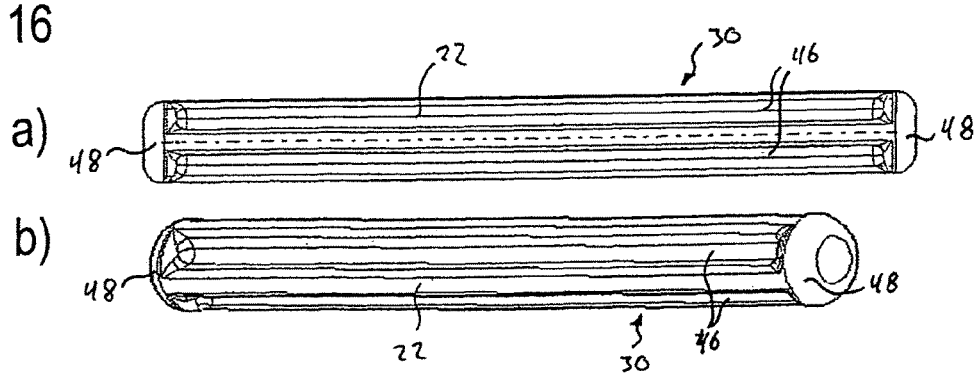
Figure 17:
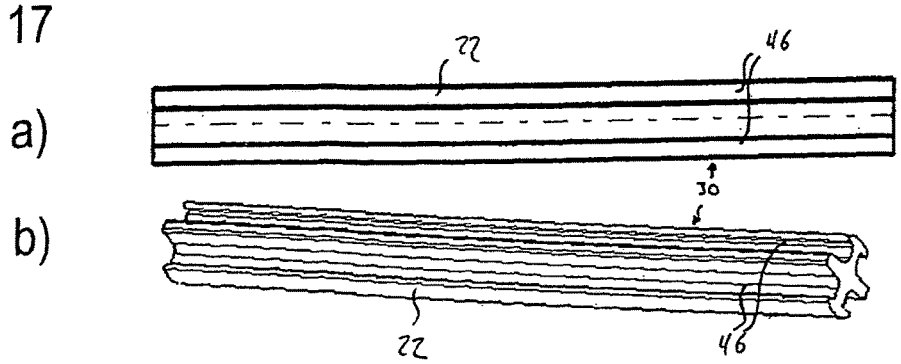

The embodiments shown in FIGS. 16a) and b) as well as 17a) and b) include grooves 46 extending in the longitudinal direction which equally serve for reducing the cross-section and thus for reducing the flexural stiffness. The grooves 46 in this case extend over the entire length of the force-transmitting element 22. The embodiment shown in FIGS. 16 a) and b) differs from the embodiment shown in FIGS. 17a) and b) merely by the fact that full-surface end areas 48 are provided which provide for a stable contacting surface for transmitting the compressive force.

Figure 18:
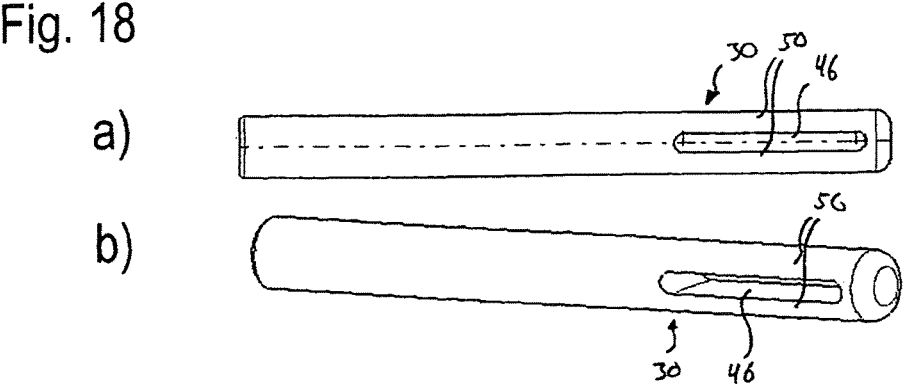

The grooves 46 also can be provided merely at the bending portion 30, as shown in FIGS. 18a) and b) as well as 19a) and b). In this embodiment the grooves 46 extend in the radial direction through the force-transmitting element 22, thereby the bending area being subdivided into plural webs 50 extending in the longitudinal direction. Due to the webs 50 which are adapted to be individually bent an especially high flexibility can be achieved.

Figure 20:
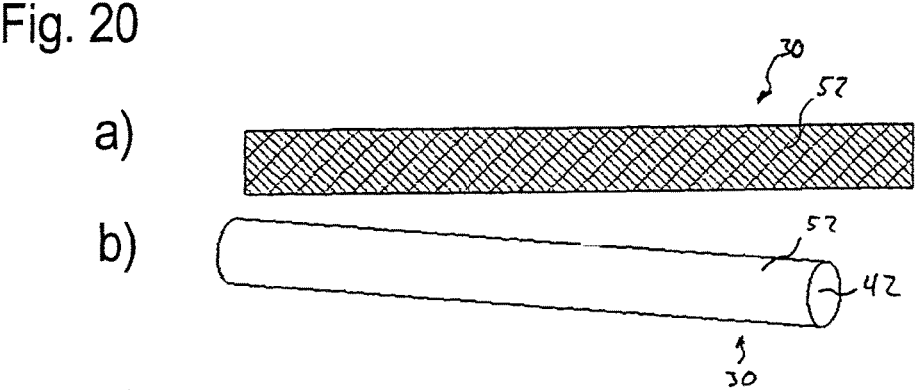

The force-transmitting element can also be covered by a wire mesh 52 as is illustrated in FIGS. 20a) and b), for example. Such wire mesh is especially flexible, wherein the compressive force is transmitted by the core 42 provided in the wire mesh 52.

Figure 21:
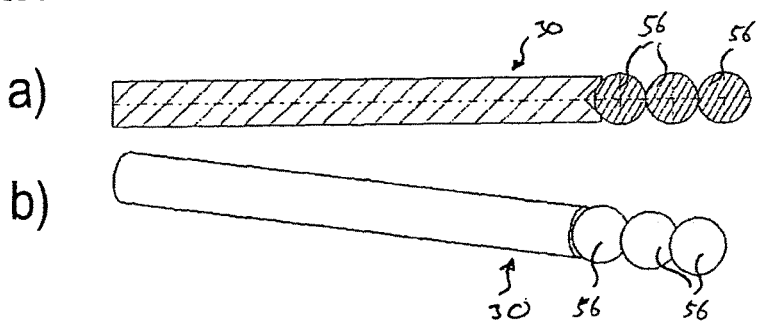
Figure 22:
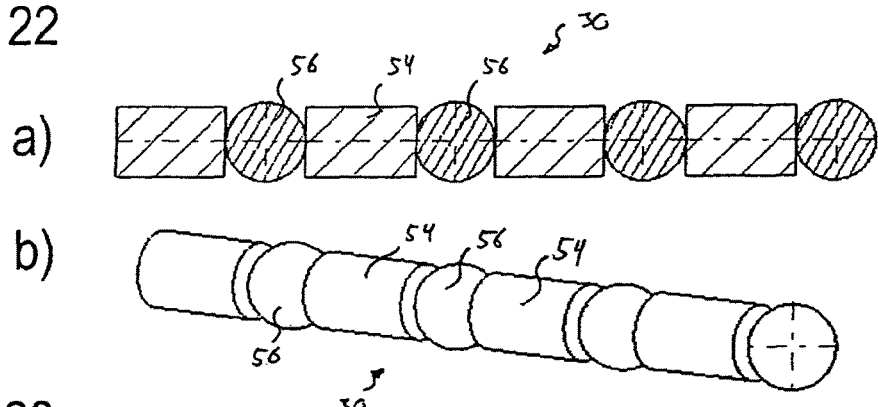
Figure 23:
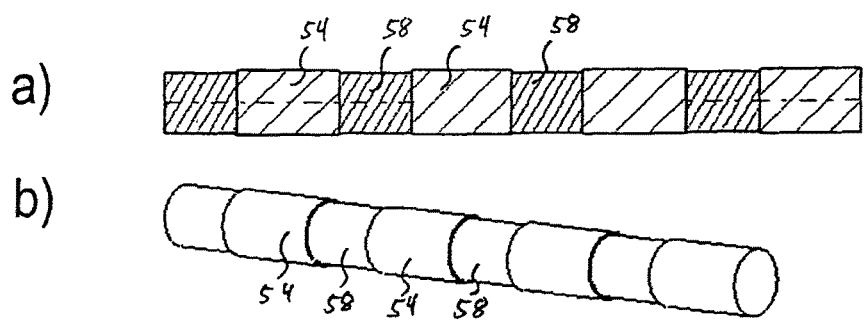

As an alternative to the embodiments illustrated so far it is also possible that the force-transmitting element 22 consists of plural segments 54, 56, 58 flexibly coupled to each other, as this is shown, e.g., in FIGS. 21a) and b) to 23a) and b). The segments 54, 56, 58 can be made of different materials. In the embodiment shown in FIGS. 21a) and b) the segments 56 are balls contacting each other. In the embodiment shown in FIGS. 22a) and b) the ball 56 and cylindrical portions 54 alternate, wherein a very flexible coupling of the cylindrical portions 54 and thus of the force-transmitting element 22 is achieved by the ball 56. In FIGS. 23 a) and b) exclusively cylindrical portions 54, 58 are provided, wherein the cylindrical portions 58 are made of a flexible material having low flexural stiffness.

Figure 24:
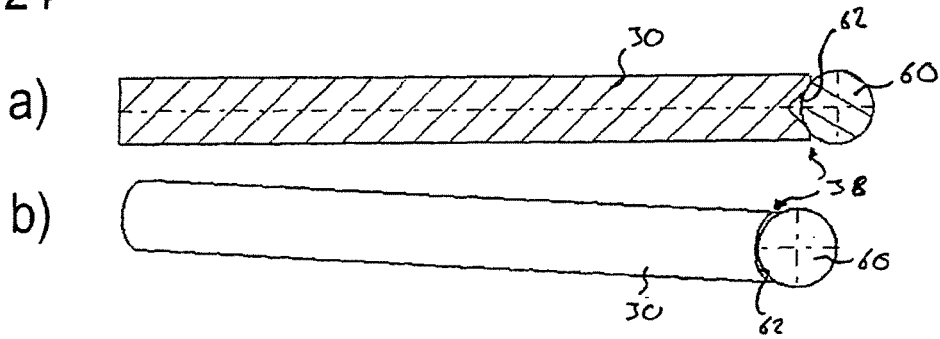

Usually an additional sealing member which is formed, for example, by a sealing ball 60 is provided between the force-transmitting element 22 and the drive unit 18. Irrespective of the embodiment the rear end 38 of the force-transmitting element 22 can be configured so that it constitutes a seat 62 for said sealing member, as it is shown, for example, in FIGS. 24a) and b).

Figure 25:
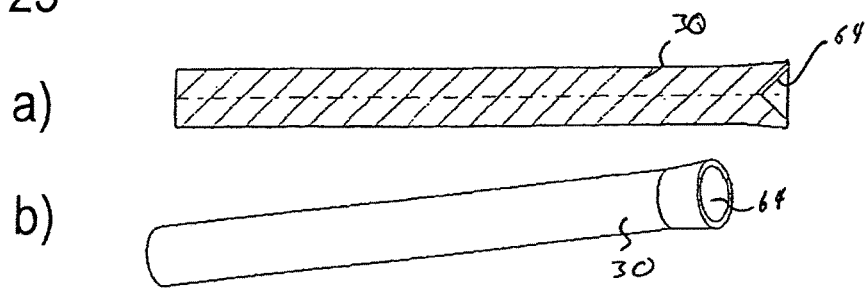

Advantageously, this sealing member is replaced by a conical widening 64 of the rear end 38 of the force-transmitting element 22, however, as is represented in FIGS. 25a) and b). With increasing pressure said conical widening 64 is pressed against the inner wall of the tensioner tube 20, thereby the sealing effect being additionally increased.

Figure 19:
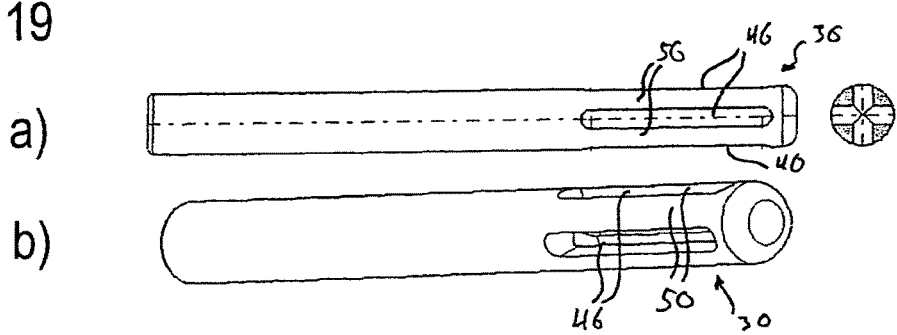

The embodiment shown in FIGS. 26a) and b) unifies plural elements of the afore-described embodiments. This embodiment is based on the form described in FIGS. 4a) and b) together with elements of FIGS. 19a) and b). In this embodiment, too, the force-transmitting element 22 includes a bending portion 30 and a constriction 32. Four webs 50 extending in the longitudinal direction are formed by two grooves 46 starting from the end face, intersecting at right angles and extending in the longitudinal direction. Two respective opposing webs are interconnected by short connecting webs 66 and 68. The connecting webs 66 and 68 extend at a distance from the constriction 32 and in direct vicinity to the grooves 46. The two connecting webs 66 and the two connecting webs 68 are moreover offset relative to each other in the axial direction. The connecting webs 66 and 68 and the constriction are additionally configured as predetermined or required breaking points. During assembly, during the tensioning operation and/or when pushing the force-transmitting element back said connecting points can break so that the force-transmitting element then consists of five single elements.

The invention claimed is:

1. A belt retractor (10) comprising a belt tensioner (16) and a force-limiting device, wherein the belt tensioner (16) includes a pivoted pinion gear (24) associated with a belt reel (14), a drive unit (18) and an oblong force-transmitting element (22) movable by the drive unit (18) which is supported at least partly in a tubular portion (21) and is adapted to be engaged in the pinion gear (24) so as to rotate the pinion gear (24) in a tensioning direction (A), wherein the force-transmitting element (22) is made of a softer material than the pinion gear (24) and the pinion gear (24) digs itself into the surface of the force-transmitting element (22) when the force-transmitting element (22) is displaced, and wherein that the force-transmitting element (22) includes a bending portion (30) which is provided at the rear end of the force-transmitting element (22) viewed in a first direction of movement (B) of the force-transmitting element (22) and which is designed to be pressure-resistant in the longitudinal direction (L) of the force-transmitting element (22) but to be flexible in a direction perpendicular to the longitudinal direction (L).

2. The belt retractor according to claim 1, wherein the bending portion (30) includes at least one constriction (32) peripheral in a circumferential direction.

3. The belt retractor according to claim 2, wherein a series of constrictions (32) is arranged at regular intervals.

4. The belt retractor according to claim 2, wherein each of a series of constrictions (32) forms an oblong area of smaller diameter viewed in the longitudinal direction (L).

5. The belt retractor according to claim 2, wherein each of a plurality of constrictions (32) has the same radial depth.

6. The belt retractor according to claim 2, wherein the force-transmitting element (22) extends along a centerline in the longitudinal direction, the at least one constriction (32) encircling the centerline.

7. The belt retractor according to claim 2, wherein the at least one constriction (32) has a first diameter and separates portions of the force-transmitting member (22) each having a second diameter greater than the first diameter.

8. The belt retractor according to claim 1, wherein the force-transmitting element (22) includes grooves (46) extending in the longitudinal direction (L).

9. The belt retractor according to claim 8, wherein the grooves (46) extend over the entire length of the force-transmitting element (22).

10. The belt retractor according to claim 8, wherein the grooves (46) are provided only at the bending portion (30).

11. The belt retractor according to claim 8, wherein the grooves (46) extend in a radial direction entirely through the force-transmitting element (22).

12. The belt retractor according to claim 1, wherein the force-transmitting element (22) includes a cavity (40) extending in the longitudinal direction (L) extending at least through the entire bending portion (30).

13. The belt retractor according to claim 12, wherein the cavity (40) extends through the entire force-transmitting element (22).

14. The belt retractor according to claim 12, wherein the cavity (40) is filled with a preferably compression-stiff core (42).

15. The belt retractor according to claim 14, wherein the core (42) is made of a harder material than the force-transmitting element (22).

16. The belt retractor according to claim 1, wherein between the bending portion (30) and the residual force-transmitting element (22) at least one predetermined breaking point is provided.

17. The belt retractor according to claim 1, wherein the force-transmitting element (22) consists of plural segments (54, 56, 58) which are flexibly coupled to each other.

18. The belt retractor according to claim 17, wherein the segments (54) are partly spacer balls (54).

19. The belt retractor according to claim 1, wherein the rear end of the force-transmitting element (22) is conically widened.

20. A belt retractor comprising:
a belt reel; and
a belt tensioner including:
a pinion gear rotatable with the belt reel and made from a first material;
a tensioner tube extending towards the pinion gear;
a force-transmitting element provided in the tensioner tube and made from a second material that is softer than the first material, the force-transmitting element including a bending portion that is pressure-resistant in a longitudinal direction of the force-transmitting element and flexible in a direction perpendicular to the longitudinal direction; and
a drive unit for moving the force-transmitting element within the tensioner tube to cause the pinion gear to rotate in a tensioning direction, wherein the pinion gear digs into the surface of the force-transmitting element when the force-transmitting element is moved by the drive unit.

21. The belt retractor according to claim 20, wherein the force-transmitting element includes at least one constriction having a first diameter and positioned to separate portions of the force-transmitting element having a second diameter larger than the first diameter.

22. The belt retractor according to claim 20, wherein the force-transmitting element extends along a centerline in the longitudinal direction, the at least one constriction encircling the centerline.

\* \* \* \* \*

UNITED STATES PATENT AND TRADEMARK OFFICE
CERTIFICATE OF CORRECTION

PATENT NO. : 9,908,503 B2
APPLICATION NO. : 14/008101
DATED : March 6, 2018
INVENTOR(S) : Brend Gentner et al.

Page 1 of 1

It is certified that error appears in the above-identified patent and that said Letters Patent is hereby corrected as shown below:

In the Claims

Column 9, Line 33 reads "preferably compression-stiff" should read --compression-stiff--

Signed and Sealed this
Twenty-second Day of May, 2018

Andrei Iancu
*Director of the United States Patent and Trademark Office*